Patented Mar. 29, 1949

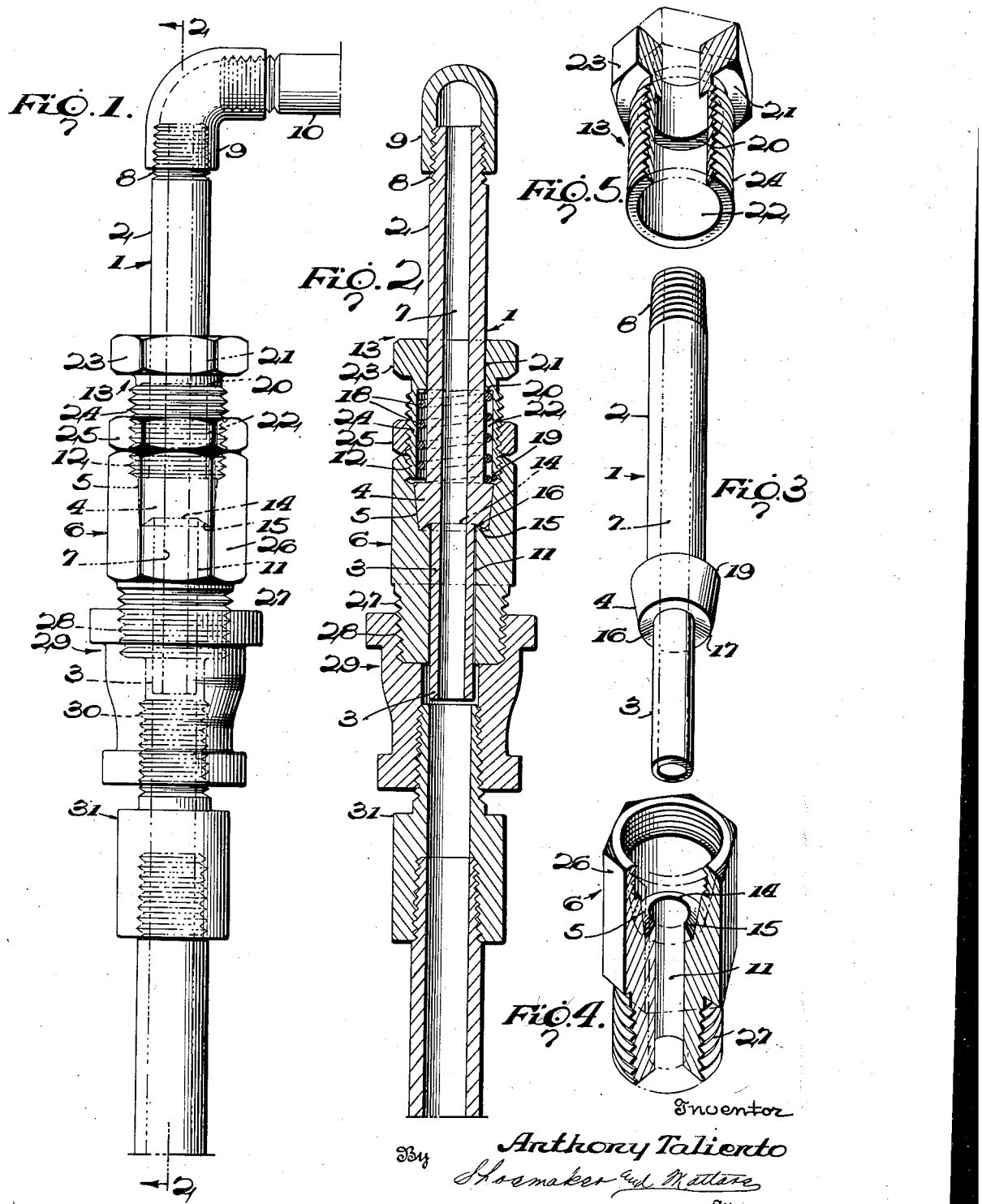

2,465,495

UNITED STATES PATENT OFFICE 2,465,495

STEAMTIGHT PACKLESS JOINT FOR STEAM PRESSING IRONS AND OTHER PURPOSES

Anthony Taliento, Rochester, N. Y.

Application September 30, 1946, Serial No. 700,199

3 Claims. (Cl. 285—97.6)

The invention relates to a steam tight packless joint for steam pressing irons and other purposes and the present application is a continuation in part of a co-pending application for "Pressing iron steam connections," filed October 7, 1942, Serial No. 461,107, now Patent No. 2,410,693.

An object of the present invention is to provide a simple, practical and comparatively inexpensive steam tight packless joint of strong and durable construction, designed for connecting the steam pipes of a steam heated pressing iron and adapted to permit free pivotal movement of the steam pipes in the manipulation of the pressing iron and at the same time maintain a steam tight joint to prevent the escape of steam.

A further object of the invention is to provide a steam tight packless joint of this character in which the coacting members of the joint or coupling will be yieldably maintained in engagement with each other and which will be readily adjustable to take up any wear of the parts and to maintain the desired pressure on the parts of the joint or coupling.

A further object of the invention is to provide a long life steam tight packless joint adapted to be readily applied to the steam pipes of a steam heated pressing iron at any point where a pivotal connection is desired and which, while maintaining a steam tight joint in both steam supply and steam exhaust pipes, will not interfere with the free and easy movement of the steam pressing iron in the operation thereof.

With these and other objects in view, the invention consists in the novel construction, combination and arrangement of parts hereinafter fully described, illustrated in the accompanying drawings and pointed out in the claims hereto appended, it being understood that various changes in the form, proportion, and minor details of construction within the scope of the appended claims may be resorted to without departing from the spirit or sacrificing any of the advantages of the invention.

In the drawings:

Figure 1 is a side elevation of a steam tight packless joint constructed in accordance with the present invention;

Figure 2 is a vertical sectional view of the same;

Figure 3 is a detail perspective view of the tubular member or pipe section;

Figure 4 is a similar view of the coupling member partly broken away and in section to illustrate the interior construction;

Figure 5 is a detail perspective view of the cap.

In the accompanying drawings in which is illustrated the preferred embodiment of the invention, the steam tight packless joint, which is designed primarily for use in steam heated pressing irons but which may be employed for various other purposes where a packless steam tight joint affording pivotal movement is desired, comprises in its construction a tubular member or pipe section 1 composed of upper and lower portions 2 and 3 and an annular tapered plug 4 located at the juncture of the upper and lower portions and having an exterior taper from top to bottom to fit an interiorly arranged tapered portion 5 of a coupling member 6. The tubular member 1, which is provided with a longitudinal bore or opening 7 of uniform diameter throughout the entire length of the tubular member, has its upper portion 2 of slightly greater diameter than its lower portion 3 and is exteriorly threaded at its upper end at 8 for engaging an elbow coupling 9 which connects the tubular member with a horizontal pipe section 10. While the steam tight packless joint is shown in the drawings as arranged in a vertical position, it may be arranged in any other position as will be readily understood. The lower portion 3 of the tubular member is smooth and is slidably received in the reduced portion 11 of the longitudinal bore or opening of the coupling member 6. The smooth reduced portion 11 of the longitudinal bore or opening of the coupling member extends from the lower end thereof to a point above midway between the ends of the coupling member but it may be varied in length, as will be readily understood.

The upper end portion 12 of the longitudinal bore or opening of the coupling member is interiorly threaded above the tapered portion 5 to receive an exteriorly threaded cap 13 and the reduction of the diameter of the longitudinal opening to form the reduced portion 11 of the bore forms a seat 14 for the lower end of the plug 4. The seat is provided with an annular V-shaped groove 15 for the reception of the lower end of the plug 4 which is recessed at its lower end to form an interior bevel 16 which co-operates with the exteriorly beveled or tapered surface of the plug to provide a relatively sharp lower edge 17 which fits into and conforms to the configuration of the V-shaped annular groove 15. The contacting surfaces of the plug 4 and the interiorly tapered portion 5 of the coupling member, together with the V-shaped groove and the tapered lower edge of the plug, form a steam tight packless joint or connection.

The tapered surfaces of the plug and the coupling member are yieldably maintained in engagement by means of a coil spring 18 which is interposed between the upper annular end face 19 of the plug and an interior shoulder 20 of the cap 13. The cap is provided with a longitudinal bore or opening which, at the upper end portion 21, is of a diameter to snugly receive the tubular member 1 and it is enlarged below the portion 21 to provide a chamber 22 for the reception of the spring 18. The cap is provided at the top with an exterior polygonal wrench-receiving flange 23 and is exteriorly reduced and threaded at 24 below the flange to screw into the upper end of the coupling member in engagement with the threaded portion 12. The tension of the spring is adjusted by means of the cap which is secured in its adjustment by a lock nut 25. The lock nut 25 engages the upper end of the coupling member and may be readily manipulated to permit an adjustment of the coil spring. The plug is automatically adjustable by the pressure of the spring to maintain a tight engagement with the coacting tapered or beveled surfaces of the coupling member and a long life of the steam tight packless joint is assured and the lower portion 3 of the tubular member being freely slidable in the reduced portion 11 of the bore or opening of the coupling member does not interfere with the automatic adjustment or positioning of the plug within the tapered portion of the coupling member.

The upper portion of the coupling member has an exterior polygonal wrench-receiving configuration 26 and the lower portion of the coupling member is exteriorly threaded at 27 to engage interior screw threads 28 of a nipple 29 which is also provided with lower interior screw threads 30 for the reception of a pipe section 31 which may be in the form of a nipple, coupling or the like.

The steam tight packless joint of the present application corresponds substantially to that illustrated in Figure 3 of the aforesaid co-pending application and affords the same pivotal movement of the parts, as fully described in said co-pending application.

What is claimed is:

1. A steam tight packless joint affording a pivotal connection between pipe sections, said joint including a tubular member having a longitudinal bore and provided intermediate its ends with an exterior annular tapered plug having a truncated lower end undercut and forming an annular bevel extending downwardly and outwardly to the lower end of the outer face of the plug, a coupling member having a longitudinal opening receiving the tubular member and enlarged at the upper portion to form a seat and tapered adjacent the same to fit said tapered plug, said seat being provided with a substantially V-shaped groove receiving the undercut lower end of the plug, a tubular cap arranged on the tubular member and having a threaded engagement with the coupling member, and a spring housed within the tubular cap and engaging the same and the plug for maintaining the latter yieldably in engagement with the tapered portion of the coupling member and the V-shaped groove of the seat thereof.

2. A steam tight packless joint affording a pivotal connection between pipe sections, said joint comprising a tubular member having a longitudinal bore and composed of upper and lower portions and an exterior annular tapered plug located at the juncture of the upper and lower portions and truncated at the lower end, the latter being undercut and forming an annular bevel extending downwardly and outwardly to the outer face of the lower end of the plug, the upper portion of the tubular member being of greater diameter than the lower portion, a coupling member having a longitudinal opening receiving the tubular member and enlarged at the upper portion to form a seat and tapered adjacent the seat to fit the tapered plug and provided in said seat with a substantially V-shaped groove receiving the undercut lower end of the plug, said coupling member being interiorly threaded at its upper end, a tubular cap arranged on the tubular member and exteriorly threaded and having a threaded engagement with the coupling member, a coiled spring housed within the tubular cap and engaging the same and the plug and maintaining the plug in engagement with the tapered portion of the coupling member and the undercut lower end of the plug in engagement with the V-shaped groove of said seat, said tubular cap being adjustable to vary the tension of the spring, and means for maintaining the spring under the desired tension.

3. A steam tight packless joint affording a pivotal connection between pipe sections, said joint comprising a tubular member having a longitudinal bore and composed of upper and lower portions and an exterior annular tapered plug located at the juncture of the upper and lower portions and truncated at the lower end, the latter being undercut and forming an annular bevel extending downwardly and outwardly to the outer face of the lower end of the plug, the upper portion of the tubular member being of greater diameter than the lower portion, a coupling member having a longitudinal opening receiving the tubular member and enlarged at the upper portion to form a seat and tapered adjacent the seat to fit the tapered plug and provided in said seat with a substantially V-shaped groove receiving the undercut lower end of the plug, said coupling member being interiorly threaded at its upper end, the lower portion of the tubular member being extended below the coupling member, a tubular cap arranged on the tubular member and exteriorly threaded and having a threaded engagement with the coupling member, a spring housed within the tubular cap and engaging the same and the plug for maintaining the plug in engagement with the tapered portion of the tubular member and the undercut lower end of the plug in engagement with said V-shaped groove, said tubular cap being adjustable for varying the tension of the spring, a lock nut arranged on and engaging the threads of the tubular cap for maintaining the spring under the desired tension, and a nipple having a threaded engagement with the lower end of the coupling member and receiving the extended lower end of the tubular member.

ANTHONY TALIENTO.

REFERENCES CITED

The following references are of record in the file of this patent:

UNITED STATES PATENTS

| Number | Name | Date |
|---|---|---|
| 295,164 | Gumlich | Mar. 18, 1884 |
| 1,042,852 | Von Boden | Oct. 29, 1912 |
| 1,587,080 | Marcelli | June 1, 1926 |
| 1,925,724 | Robinson | Sept. 5, 1933 |
| 2,101,937 | Giberson | Dec. 14, 1937 |
| 2,326,037 | June | Aug. 3, 1943 |

FOREIGN PATENTS

| Number | Country | Date |
|---|---|---|
| 5,192 | Great Britain | Dec. 18, 1878 |